Patented Oct. 5, 1943

2,330,798

UNITED STATES PATENT OFFICE 2,330,798

VULCANIZED, FATTY OIL MODIFIED, CRACKED DISTILLATE POLYMER

Martin B. Chittick, Wilmette, and Arthur F. Schlandt, Elmhurst, Ill., assignors to The Pure Oil Company, Chicago, Ill., a corporation of Ohio No Drawing. Application November 4, 1939, Serial No. 302,854

5 Claims. (Cl. 260—23)

This invention relates to the preparation of mastics from petroleum polymers by reaction thereof with sulfur in the presence of fatty oils.

In the refining of distillates such as gasoline, resulting from cracking of petroleum distillates at high temperatures, in order to remove therefrom gum-forming and color imparting bodies, it is customary to subject the distillate to conditions under which these bodies undergo selective polymerization. Probably the best known method for this selective polymerization is to contact the distillate in either vapor or liquid state at temperatures ranging from 200° to 600° F. with fuller's earth or similar catalytic adsorptive clays capable of selectively polymerizing the gum-forming and color imparting bodies to high boiling constituents which can be separated from the remaining distillate by fractionation. The resulting polymers have a high degree of unsaturation and combine readily with sulfur and other chemical reagents. Polymers suitable as starting material for this invention can also be prepared by refining in the manner above set forth gasoline boiling constituents resulting from the conversion or polymerization of hydrocarbon gases or from the dehydrogenation or isomerization of light petroleum distillates.

Another method for selectively polymerizing gum-forming and color imparting constituents is by means of cold or dilute sulfuric acid treatment.

It has been found that these highly unsaturated polymers can be chemically combined with sulfur and certain fatty oils to produce tough, resilient mastic compositions suitable for the preparation of tile, floor and wall coverings and for the production of various articles in which hard rubber has heretofore been used. The oils which have been found which will unite with sulfur and polymer to give the desired product are castor, perilla, linseed, tung oils and bodied fish oil.

In carrying out the invention, it is preferable to first reduce the polymer by steam and/or vacuum distillation until the solid content of the polymer as measured by the A. S. T. M. method for varnish is at least 60% and preferably over 80%. The polymer when reduced will have an iodine number (Wijs) between 190 and 300. As an example of polymer which forms a suitable starting material, the polymer prepared by passing gasoline resulting from cracking petroleum oil at temperatures between 1000° and 1100° F., in vapor state at temperatures of about 300° F. through a Gray tower (tower packed with fuller's earth) and then steam distilling the resulting polymer, is typical:

| | |
|---|---|
| Gravity | A. P. I__ 10 to 11 |
| Flash, minimum | °F__ 230 |
| Fire, minimum | °F__ 280 |
| Viscosity at 210° F. (Saybolt) | 225 to 300 |
| Pour, approximately | °F__ 45 |
| Iodine number, minimum | 200 |
| Percent solids, minimum | 85 |

The polymer is mixed with sulfur and oil and the mixture cooked while being stirred at a temperature between approximately 140° and 160° C. but below 170° C. for a period ranging from approximately one-half to three hours. When the reaction temperature is raised above 170° C. the resulting product is no longer rubbery and resilient. Upon cooling, the mixture is found to have formed a vulcanized rubbery mass which is hard and resilient. The material can be formed either by molding, pressing or by calendering into articles of suitable shape or into floor or wall coverings or tile.

The action between the oil, polymer and sulfur can be catalyzed by addition of small amounts, as for example, 1% of sulfur monochloride or phosphorus pentasulfide. These catalysts reduce the time required for vulcanization.

In order to obtain a product of the desired resiliency and toughness, it should contain from approximately 20% to 40% by weight of sulfur and approximately 30% or more of one or more oils of the groups above specified. Various organic and inorganic fillers such as saw dust, silica, whiting and slate dust may be added as well as organic or inorganic fibers such as hair, felt and asbestos in order to impart toughness to the composition to various degrees depending upon the amount of and kind of fiber and/or filler added. The resulting product will withstand fairly high temperatures without materially softening. If filler or fiber is added to the composition, the percentage of sulfur and oil present will accordingly be reduced.

As specific examples of the invention the following are given:

Example I 40 grams of sulfur, 40 grams of castor oil and 60 grams of polymers approximating in composition the polymers above set forth, were heated at approximately 162° C. for two hours. The resulting product was black, very rubbery adhesive material which upon setting over night turned into a gray material with a distinct rubbery appearance.

Example II 41 parts by weight of polymer having characteristics above described, 27.5 parts of sulfur and 31.5 parts of castor oil were heated during mixing for a period of one hour during which the temperature was gradually raised from 100° to 160° C. The product obtained was stiff and rubbery.

Example III 41 parts by weight of the polymer above described, 27.5 parts of sulfur and 31.5 parts of linseed oil were heated for one hour during which the temperature was raised gradually from 115° to 160° C. The resulting product was stiff and rubbery.

Example IV 39.2 parts by weight of polymer above described, 30.6 parts of sulfur and 30.2 parts of perilla oil were heated for two hours during which the temperature was gradually raised from 115° to 145° C. A rubber-like product similar to that obtained in Examples II and III was obtained.

Example V

Another batch of material was made by heating 38.9 parts by weight of the above described polymer, 31.3 parts sulfur and 29.8 parts of perilla oil, for a period of one hour during which the temperature was raised gradually from 111° to 150° C. A stiff rubber-like product was obtained which was tougher than that obtained in Example IV.

Example VI 30 grams of linseed oil, 40 grams of sulfur and 30 grams of polymers approximating in composition the polymers above set forth, were heated at approximately 155° C. for one hour. The resulting product was a black, rubbery material which turned gray upon setting overnight.

Example VII 30 grams of sulfur, 50 grams of linseed oil and 20 grams of the above described polymer were heated together at 143–165° C. for a period of one hour. A black, rubber-like material was obtained which was much softer than that obtained in Example VI.

The same experiment was tried substituting soy bean, sperm and lard oil in place of castor, linseed or perilla oil, but it was not possible to obtain the rubber-like material when these oils were used.

The product prepared in accordance with this invention is elastic and much less brittle than sulfurized petroleum polymer. Unlike the sulfurized polymer, it will not melt at elevated temperatures. The material can be milled and rolled out into sheet material or can be bonded to a loose fabric or porous solid in order to produce a wear-resistant covering and one which is highly resistant to corrosion. The product can be molded to produce various objects including floor tile, expansion joints and other articles of commerce. The material may be pigmented to produce various colors by adding such pigments as chrome green or red oxide of iron.

As used herein, vulcanized is used to define a product which stiffens during the course of reaction and which upon cooling forms a stiff, rubber-like product which cannot be remelted without decomposition.

We claim:

1. A vulcanized, rubber-like, elastic composition of matter comprising the product formed by reacting for a period between one-half and 3 hours sufficient to produce a rubber-like mass and at a temperature above 140° C. but below 170° C., approximately 20% to 40% by weight of sulfur, approximately the same amount of oil selected from the group consisting of castor, perilla, tung, linseed and bodied fish oil, and the balance hydrocarbon polymer resulting from the contacting of diolefin-containing light, cracked, hydrocarbon distillates at elevated temperature of approximately 93–316° C. with catalytic adsorptive clay.

2. The method of preparing a rubber-like material which comprises mixing together sulfur, oil selected from the group consisting of castor, perilla, tung and linseed and bodied fish oil and hydrocarbon polymer having an iodine number above 190 and a solid content in excess of 60, said polymer resulting from contacting diolefin-containing light, cracked, hydrocarbon distillates with catalytic adsorptive clay at elevated temperature between approximately 93–316° C., in the proportions of 20 to 40 parts by weight of sulfur, approximately 30 parts by weight of oil and the balance polymer, and heating the mixture for a period between one-half to three hours sufficient to produce a vulcanized, rubber-like product at temperatures above 140° C. but below 170° C.

3. Composition in accordance with claim 1 in which the ratio of sulfur, oil and polymer by weight is: sulfur, 2–4; oil, 3–4; and polymer, 5–2.

4. Composition in accordance with claim 1 containing filler in sufficient quantity to impart additional toughness to the composition.

5. Method in accordance with claim 2 in which the ratio of sulfur, oil and polymer by weight is: sulfur 2–4; oil, 3–4; and polymer 5–2, and in which filler is added to the mixture prior to vulcanization in an amount sufficient to obtain the desired toughness in the finished product.

MARTIN B. CHITTICK.
ARTHUR F. SCHLANDT.